United States Patent
Niell et al.

(10) Patent No.: US 7,412,584 B2
(45) Date of Patent: Aug. 12, 2008

(54) DATA ALIGNMENT MICRO-ARCHITECTURE SYSTEMS AND METHODS

(75) Inventors: Jose S. Niell, Franklin, MA (US); Gilbert M. Wolrich, Framingham, MA (US); Thomas L. Dmukauskas, Cambridge, MA (US); Mark B. Rosenbluth, Uxbridge, MA (US)

(73) Assignee: Intel Corporation, Santa Clara, CA (US)

( * ) Notice: Subject to any disclaimer, the term of this patent is extended or adjusted under 35 U.S.C. 154(b) by 269 days.

(21) Appl. No.: 10/838,078

(22) Filed: May 3, 2004

(65) Prior Publication Data
US 2005/0251642 A1   Nov. 10, 2005

(51) Int. Cl.
*G06F 12/00* (2006.01)
(52) U.S. Cl. .................................... 711/201; 712/204
(58) Field of Classification Search ................. 711/201
See application file for complete search history.

(56) References Cited

U.S. PATENT DOCUMENTS

| | | | | |
|---|---|---|---|---|
| 5,423,010 A | * | 6/1995 | Mizukami | 341/60 |
| 5,450,557 A | * | 9/1995 | Kopp et al. | 712/24 |
| 6,061,779 A | * | 5/2000 | Garde | 712/204 |
| 6,330,631 B1 | * | 12/2001 | Crosland | 710/306 |
| 2003/0167390 A1 | * | 9/2003 | Gorman et al. | 712/300 |

* cited by examiner

*Primary Examiner*—Kevin Ellis
*Assistant Examiner*—Hashem Farrokh
(74) *Attorney, Agent, or Firm*—Daly, Mofford, Crowley & Durkee, LLP

(57) ABSTRACT

Systems and methods are disclosed for aligning data in memory access and other applications. In one embodiment a system is provided that includes a memory unit, a shifter, and control logic operable to route data from the memory unit to the shifter and to send an indication to the shifter of an amount by which the data is to be shifted. In one embodiment, the control logic provides support for speculative execution. The control logic may also permit multiplexing of big endian and little endian data alignment operations, and/or multiplexing of data alignment operations with non-data alignment operations. In one embodiment, the memory unit, shifter, and control logic are integrated within a processing unit, such as a microengine in a network processor.

16 Claims, 9 Drawing Sheets

DATA ALIGNMENT MICRO-ARCHITECTURE SYSTEMS AND METHODS

BACKGROUND

Advances in networking technology have led to the use of computer networks for a wide variety of applications, such as sending and receiving electronic mail, browsing Internet web pages, exchanging business data, and the like. As the use of computer networks proliferates, the technology upon which these networks are based has become increasingly complex.

Data is typically sent over a network in small packages called "packets," which may be routed over a variety of intermediate network nodes before reaching their destination. These intermediate nodes (e.g., routers, switches, and the like) are often complex computer systems in their own right, and may include a variety of specialized hardware and software components.

For example, some network nodes may include one or more network processors for processing packets for use by higher-level applications. Network processors are typically comprised of a variety of components, including one or more processing units, memory units, buses, controllers, and the like.

In some systems, different components may be designed to handle blocks of data of different sizes. For example, a processor may operate on 32-bit blocks of data, while a bus connecting the processor to a memory unit may be able to transport 64-bit blocks. Similarly, many computing and networking standards indicate that data should be stored in one format, while other standards, architectures, and conventions indicate that data should be processed in a different format. For example, many networking standards deal with data streams of 8-bit bytes, while many computing architectures process data in 16, 32, or 64-bit words. As a result, proper translation between the differing data formats is generally needed to ensure efficient and/or correct operation of the system.

BRIEF DESCRIPTION OF THE DRAWINGS

Reference will be made to the following drawings, in which.

DESCRIPTION OF SPECIFIC EMBODIMENTS

Systems and methods are disclosed for aligning data in memory access and other data processing applications. It should be appreciated that these systems and methods can be implemented in numerous ways, several examples of which are described below. The following description is presented to enable any person skilled in the art to make and use the inventive body of work. The general principles defined herein may be applied to other embodiments and applications. Descriptions of specific embodiments and applications are thus provided only as examples, and various modifications will be readily apparent to those skilled in the art. For example, although several examples are provided in the context of Intel® Internet Exchange network processors, it will be appreciated that the same principles can be readily applied in other contexts as well. Accordingly, the following description is to be accorded the widest scope, encompassing numerous alternatives, modifications, and equivalents. For purposes of clarity, technical material that is known in the art has not been described in detail so as not to unnecessarily obscure the inventive body of work.

Systems and methods are described for accelerating data alignment, along with several alternative embodiments that reduce physical area requirements and enhance support for speculative execution. For purposes of explanation, many of the examples presented below address the problem of aligning data comprised of 8-bit bytes to a 32-bit boundary. However, it will be appreciated that the systems and methods presented herein are readily adaptable for broader application, and can be modified to align data of any suitable size along any suitable boundary.

Figure 1A:
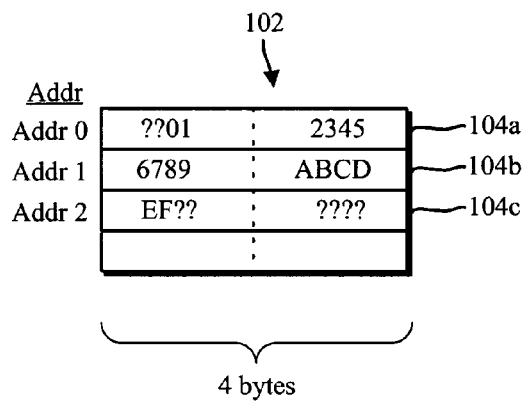
FIG. 1A illustrates data that is not aligned.

FIGS. 1A, 1B, 2A, and 2B illustrate aligned and misaligned data. FIG. 1A shows a memory unit 102 that includes three memory locations 104a, 104b, 104c. Each memory location 104 is capable of holding a 32-bit data word (i.e., four 8-bit bytes). In the example shown in FIG. 1A, memory 102 contains the 64-bit string "0123456789ABCDEF," along with other miscellaneous data denoted by question marks. In this example, each character (i.e., "1," "2," "A," "B," etc.) represents four bits of data (i.e., one hexadecimal digit).

The part of the string contained in memory location 104a (i.e., "012345") does not fit exactly. That is, 8-bits of data (denoted by two question marks) occupy the leftmost 8 bits, while the string "012345" occupies the rightmost 24 bits. Similarly, the end of the string (i.e., "EF") is located in the leftmost 8 bits of memory location 104c, while other data (i.e., "??????") occupies the rightmost 24 bits.

If a processor or other system component handles data in 32-bit blocks, it may mistakenly treat the data denoted by question marks as if it were part of the string "0123456789ABCDEF."

Figure 1B:
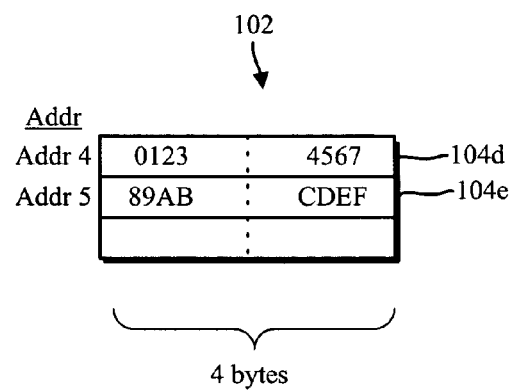
FIG. 1B illustrates data that is aligned.

FIG. 1B shows a memory 102 containing the same string shown in FIG. 1A (i.e., "0123456789ABCDEF"). In FIG. 1B, however, the string is aligned along the memory's 32-bit boundaries. The result is that memory 102 is able to store the string in two memory locations rather than three. In addition, when a processor or other component reads data from one of these memory locations, the entire 32-bit word will form part of the string, thus simplifying further processing or other handling of the data.

Figure 2A:
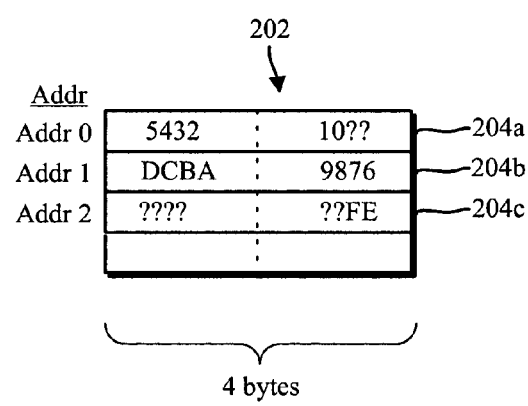
FIG. 2A illustrates little endian data that is not aligned.

FIG. 2A show another example of misaligned data. In the example shown in FIG. 2A, memory 202 stores the same data shown in FIG. 1A; however, the data is arranged somewhat differently. In particular, while the data shown in FIG. 1A is stored with its most significant bits in the leftmost (or lowest) memory locations (i.e., in "big endian" form), in FIG. 2A the data is stored with its most significant bits in the rightmost (or highest) memory location (i.e., in "little endian" form). That is, in FIG. 1A the first (or "most significant") part of the data stored in each memory location is placed at the first part of the memory location; while in FIG. 2A, the most significant part of the data stored in each memory location is placed in the last part of the memory location.

Figure 2B:
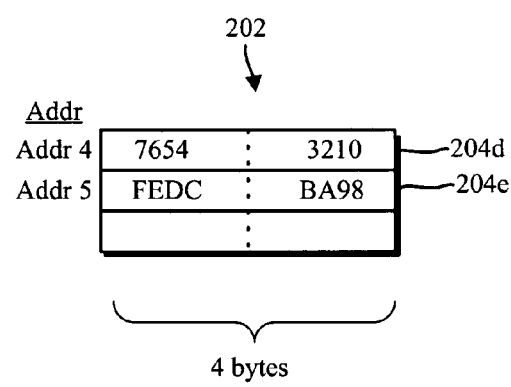
FIG. 2B illustrates aligned little endian data.

FIG. 2B shows a memory 202 containing the same string shown in FIG. 2A (i.e., "0123456789ABCDEF"). In FIG. 2B, however, the string is aligned along the memory's 32-bit boundaries.

It will be appreciated that in other embodiments data could be stored in other forms, and that the big endian and little endian forms shown in FIGS. 1A, 1B, 2A, and 2B are provided for purposes of illustration and not limitation. It will also be appreciated that other conventions for arranging data may exist (indeed, there are other conventions for defining big endian and little endian), and the systems and methods described herein can be readily adapted to any suitable formatting convention.

Misaligned data such as that shown in FIGS. 1A and 2A can be aligned in the manner shown in FIGS. 1B and 2B using a variety of hardware and/or software techniques. One way to align data is to use software executed on a general-purpose processor. For example, software could be written that contained a branch tree similar to that shown in Table 1, in which nested case statements are used to select the correct mode (e.g., big endian or little endian) and offset (i.e., the magnitude of the misalignment). The software instructions could be executed by a general-purpose processor, using the processor's arithmetic logic unit (ALU) and built-in shifting logic to align the data.

TABLE 1

```
Case (Mode)
    BIG_ENDIAN:
        Case (Offset)
            0: Big_endian alignment with offset 0
            1: Big_endian alignment with offset 1
            2: Big_endian alignment with offset 2
            3: Big_endian alignment with offset 3
    LITTLE_ENDIAN:
        Case (Offset)
            0: Little_endian alignment with offset 0
            1: Little_endian alignment with offset 1
            2: Little_endian alignment with offset 2
            3: Little_endian alignment with offset 3
```

Although an all-software solution has the advantage of enabling relatively easy modification to the alignment algorithm, the software may consume a relatively large amount of memory, and may be relatively slow due to, e.g., the size of the branch tree shown in Table 1.

Figure 3:
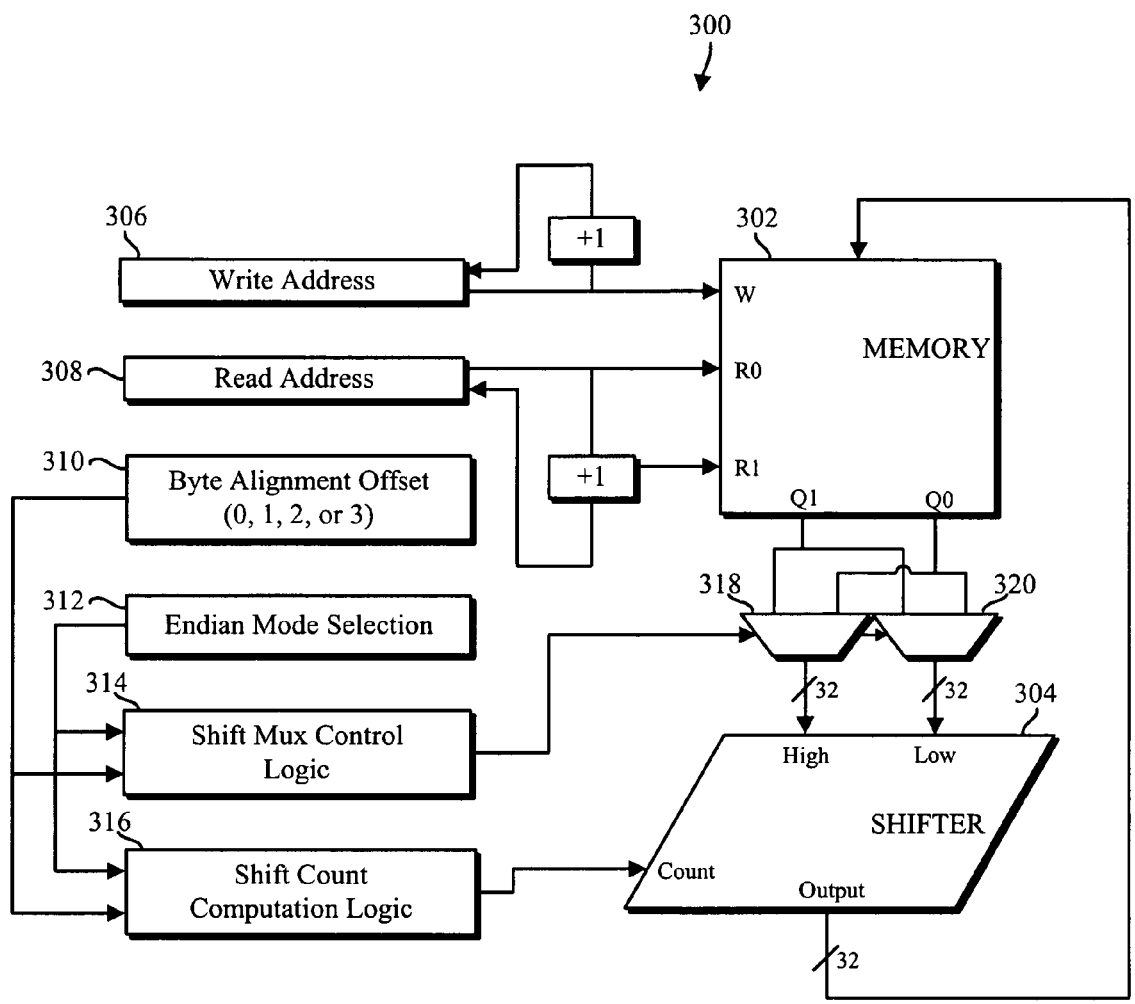
FIG. 3 is a diagram of an illustrative circuit for aligning data.

Thus, in one embodiment the data alignment algorithm is at least partially implemented in hardware. This can speed the alignment process, and/or result in consumption of less memory. An example of such a system 300 is shown in FIG. 3. Example system 300 includes a memory unit 302, such as random access memory (RAM) or a set of addressable registers built using latches or flip-flops; and a shifter 304 with a 64-bit input (shown as a 32-bit high input and a 32-bit low input) and a 32-bit output. In one embodiment shifter 304 is operable to shift data received on its input to the right by the number of bits specified by the shifter's "count" input (or an amount derived therefrom). The rightmost 32 bits of the result are then sent to the shifter's output, and the leftmost 32 bits are discarded. That is, the shifter performs the following function: Output[31:0]=[Input[63:0]>>Shift_Count] AND 0xFFFFFFFF.

As shown in FIG. 3, system 300 also includes address registers or pointers 306, 308; byte alignment offset logic 310 for identifying data misalignment; mode selection logic 312 for identifying the format of data stored in memory 302; multiplexer control logic 314 for controlling the multiplexers 318, 320 that route data to shifter 304; and shift count computation logic 316 for determining the magnitude of the shift performed by shifter 304.

Address registers or pointers 306, 308 provide read and write addresses to memory 302. Mode selection logic 312 facilitates detection of the format of the memory's data (e.g., big endian or little endian), and/or communication of this information to multiplexer control logic 314. Multiplexer control logic 314 processes this information, and sends control signals to multiplexers 318, 320, which route incoming data to shifter 304 accordingly.

Shift count computation logic determines the desired magnitude of the shift by examining the degree of data misalignment specified by byte alignment offset logic 310 and the format of the data, as indicated by mode selection logic 312. The resulting shift count is then sent to shifter 304, where it is used to determine the number of bits by which to shift the incoming data.

In one embodiment, the system 300 shown in FIG. 3 operates by accepting programmer-specified values for the data address, byte alignment offset, and the endian mode (e.g., big endian or little endian). The address may be automatically incremented after each cycle by hardware or software. In some embodiments, byte alignment offset logic 310 and/or mode selection logic 312 are simply registers for storing programmer specified values, while in other embodiments byte alignment offset logic 310 and/or mode selection logic 312 include circuitry for determining the data offset and mode from programmer specified values, inspection of data stored in memory 302, and/or the like.

In one embodiment the shifter supports shift counts of 0, 8, 16, and 24 bits, and the hardware control algorithm implemented by system 300 includes special-purpose logic for handling big endian byte alignment when the byte offset is 0, thus enabling a 32-bit shift to be performed using a relatively simple shifter 304 that need not provide native support for a 32-bit shift. In particular, in one embodiment, upon detecting big endian data with a byte alignment offset of 0, multiplexer control logic 314 is operable to route the contents of the memory location specified by address pointer 308 to the lower 32-bit input of shifter 304, rather than to the upper 32-bit input, as would normally be the case for big endian data. The upper 32-bit input is fed 0s, or arbitrary data, since it will be discarded (e.g., by performing an AND operation on it with a string of 0s) when the shifter's 32-bit output is generated. That is, multiplexer control logic 314 recognizes that a right shift of 32 bits is equivalent to simply moving the data stored at one 32-bit memory address to the next 32-bit memory address.

Figures 4, 4A:
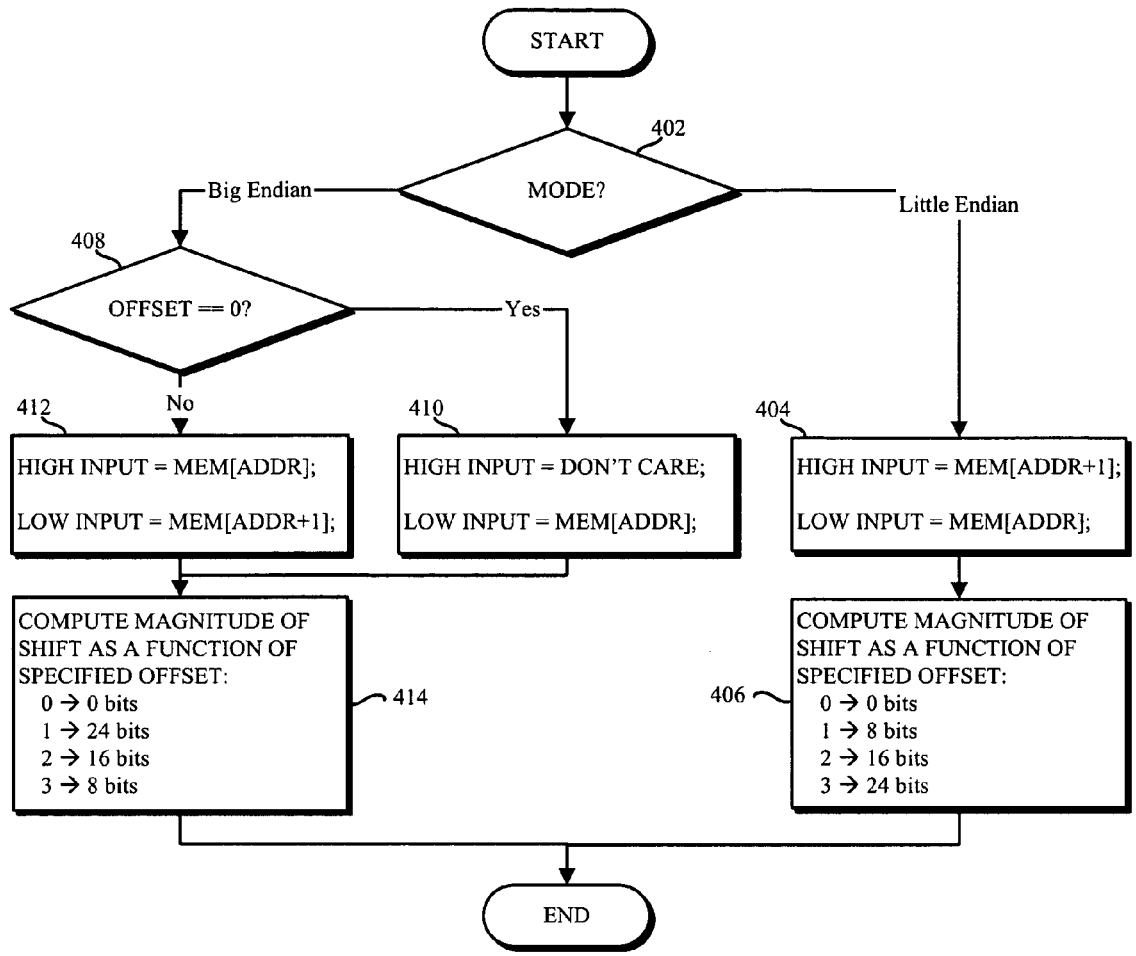
FIG. 4 is a flowchart of an illustrative process for aligning data.
FIG. 4A illustrates an embodiment of shift count computation logic.

FIG. 4 and Table 2 show an exemplary control algorithm for the micro-architecture shown in FIG. 3. As shown in FIG. 4 and Table 2, if the data stored in memory 302 is in little endian form (e.g., such as shown in FIGS. 2A and 2B), then the data stored at the address specified by read pointer 308 is routed to the lower 32-bit input of shifter 304, and the data stored at the next address (i.e., address+1) is routed to the upper 32-bit input (block 404). Next, the data on the shifter inputs is shifted to the right as indicated by the specified offset (block 406). For example, if the offset equals 0, the data is not shifted; if the offset equals 1, the data is shifted by 8 bits; and so forth.

TABLE 2

Little Endian Control Algorithm
    Lower 32 bit shifter input = Mem[address]
    Upper 32 bit shifter input = Mem[address+1]
    Case (offset) {
        0: right shift count = 0
        1: right shift count = 8
        2: right shift count = 16
        3: right shift count = 24}
Big Endian Control Algorithm
    if (Byte Alignment Offset = = 0) {
        Lower 32 bit shifter input = Mem[address]
        Upper 32 bit shifter input = DON'T CARE}
    else (
        Lower 32 bit shifter input = Mem[address+1]
        Upper 32 bit shifter input = Mem[address]}
    Case (offset) {
        0: right shift count = 0
        1: right shift count = 24
        2: right shift count = 16
        3: right shift count = 8}

If, however, the data is stored in memory 302 in big endian form (i.e., a "big endian" exit from block 402), a check is first made to see if the offset equals zero (block 408). If the offset equals zero (i.e., a "yes" exit from block 408), then the data stored at the address specified by read pointer 308 is routed to the lower 32-bit input of shifter 304 to facilitate an effective shift of 32 bits in the manner described above (block 410). Otherwise, if the offset does not equal zero (i.e., a "no" exit from block 408), the data stored at the address specified by read pointer 308 is routed to the upper 32-bit input of shifter 304, and the data stored at the next address (i.e., address+1) is routed to the lower 32-bit input (block 412). Multiplexer control logic 314 ensures that data is routed to the proper shifter inputs by instructing multiplexers 318 and 320 to make the appropriate selection between their two inputs. The data on the shifter inputs is then shifted to the right as specified by the offset (block 414). For example, if the offset equals 0, the data is not shifted; if the offset equals 1, the data is shifted by 24 bits; and so forth.

The appropriate shift count is determined by shift computation logic 316, which examines the specified offset (e.g., 0, 1, 2, or 3) and the mode (e.g., big or little endian), and computes (or retrieves) the appropriate magnitude for the shift in accordance with the table shown in FIG. 4A, which illustrates the appropriate magnitude of various right shifts. It will be appreciated that in other embodiments of the system shown in FIG. 3, a left shifter (or multi-directional shifter) could be used, and that the values shown in FIG. 4A could be readily changed accordingly.

Figure 5:
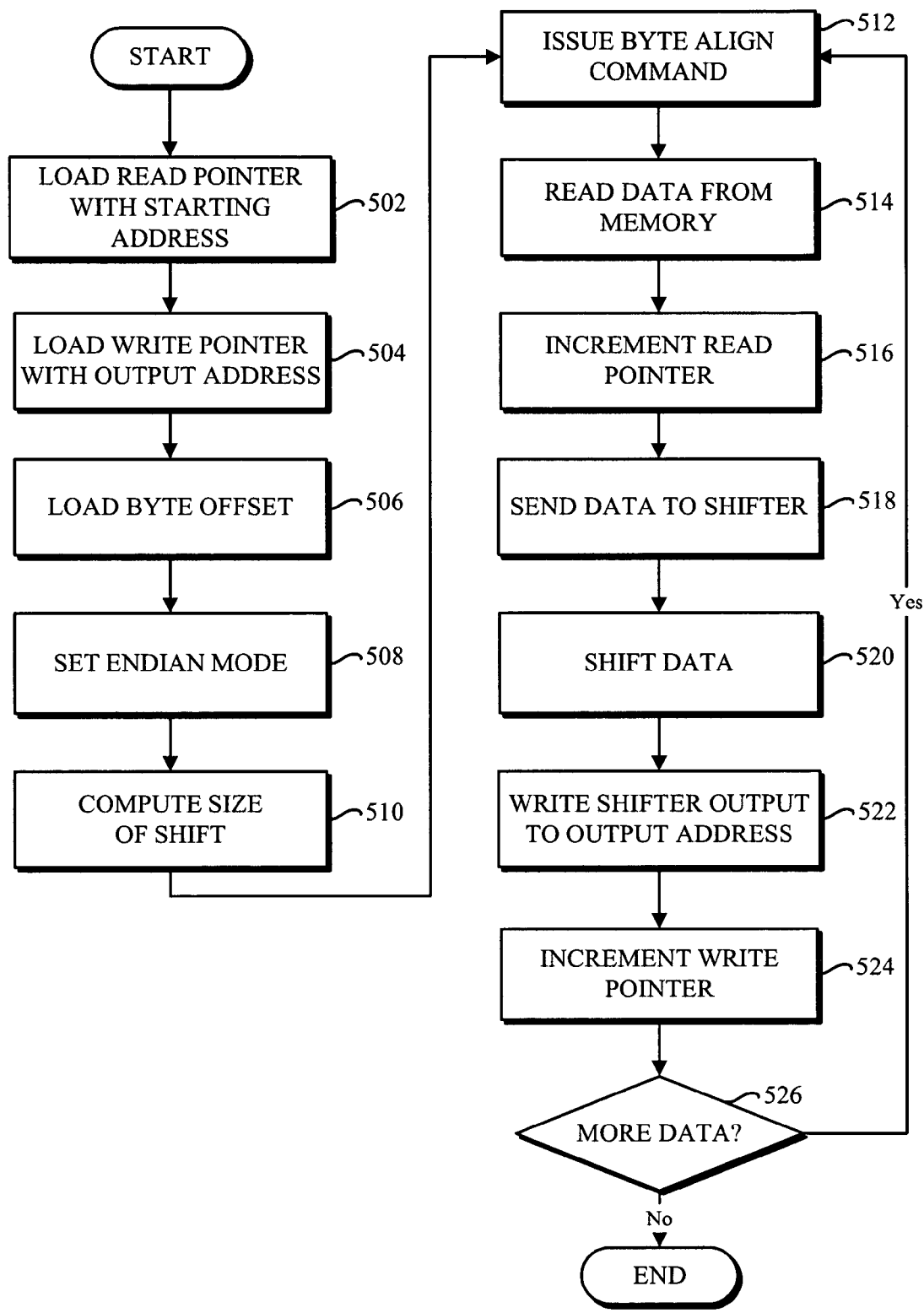
FIG. 5 is a flowchart of an illustrative process for aligning data using a system such as that shown in FIG. 3.

FIG. 5 illustrates the use of the systems and methods shown in FIGS. 3 and 4 to align data such as that shown in FIG. 1A. As shown in FIG. 5, read address pointer 308 is first loaded with the address of the initial data to be read (e.g., Addr 0 in FIG. 1A) (block 502). This address, along with the next address (i.e., address+1), are provided as input to memory bank 302 on input address lines R0 and R1. Similarly, the write address pointer 306 is initialized with the memory address at which the first byte of aligned data is to be written (e.g., Addr 4 in FIG. 1B) (block 504). Byte alignment offset register 310 is loaded with appropriate byte offset (e.g., a value of 1 for the data shown in FIG. 1A) (block 506). The offset value is provided as an input to the shift multiplexer control logic 314 and the shift count computation logic 316, where it is used as described above in connection with FIGS. 3 and 4. In addition, the endian mode selection register 312 is initialized to indicate the endian mode of the data stored in memory 302 (block 508). The value contained in the endian mode register is used by the multiplexer control logic 314 and the shift count computation logic 316 in the manner previously described. It will be appreciated that the initialization operations shown in blocks 502 through 508 could be performed in any suitable order (or in parallel), and that the order shown in FIG. 5 is provided for purposes of illustration and not limitation.

Referring once again to FIG. 5, the magnitude of the shift is computed by shift count computation logic 316 (block 510). For the data shown in FIG. 1A, shift count computation logic 316 would calculate a right shift of 24 bits, since the data is stored in big endian form with a byte offset of 1. Upon receiving a byte alignment command (block 512), data is retrieved from the memory locations specified by read pointer 308 (i.e., memory locations 104a and 104b in FIG. 1A) (block 514). The read pointer is then incremented (block 516), and the data is provided as input to the shifter 304 (block 518). In the example being discussed in connection with FIGS. 1A and 1B, the data that is read from address 104a is "??01 2345," and the data read from address 104b is "6789 ABCD." In this example, multiplexer control logic 314 directs multiplexers 318 and 320 to route the data retrieved from address 104a to the shifter's upper input, and to route the data retrieved from address 104b to the shifter's lower input.

The shifter 304 then shifts the data by the amount specified by shift count computation logic 316 (i.e., 24 bits in the FIG. 1A example)(block 520). The output of shifter 304 is then written to the memory location specified by write pointer 306 (block 522), and the write pointer is incremented (block 524). In the example being discussed in connection with FIGS. 1A and 1B, the output of the shifting resource would be "0123 4567," which would be written to memory location 104d.

Shifter 304 is now ready to handle the next segment of data. If there is additional data to align (i.e., a "yes" exit from block 526), then upon receipt of the next byte alignment command (block 512), the process shown in blocks 514-526 repeats itself. Thus, continuing with the example shown in FIGS. 1A and 1B, the data at locations 104b and 104c is read from memory 302 (block 514), and passed to shifter 304 (block 518), which performs a right-shift of 24 bits (block 520), discards the upper 32 bits, and writes the results to the memory location specified by write pointer 306 (block 522). The result is the data arrangement shown in FIG. 1B.

It will be appreciated that the flow diagram shown in FIG. 5 illustrates one possible method for aligning data using a system such as that shown in FIG. 3, and that a variety of modifications could be made to this algorithm without affecting the result. For example, the order of some of the blocks could be varied, and/or other blocks could be combined or eliminated. For example, the read and write pointers could be set and/or incremented at substantially the same time (e.g., on the same clock cycle), rather than sequentially as shown in FIG. 5.

A micro-architecture such as that described in connection with FIGS. 3 through 5 can be used to enable N words of data to be aligned in N clock cycles. In some embodiments, a programmer can initiate alignment of new, independent blocks of data prior to completing the alignment of a current block of data. Initiating a new alignment, or resuming the alignment of a block of data, can be done without performance penalty, and can be done independent of the endian mode. In addition, in some embodiments the programmer can, without penalty, use the shifting resource for non-alignment operations prior to completing the alignment of a block of data.

Reduced Area with Delay Registers on Shifter Inputs

Figure 6:
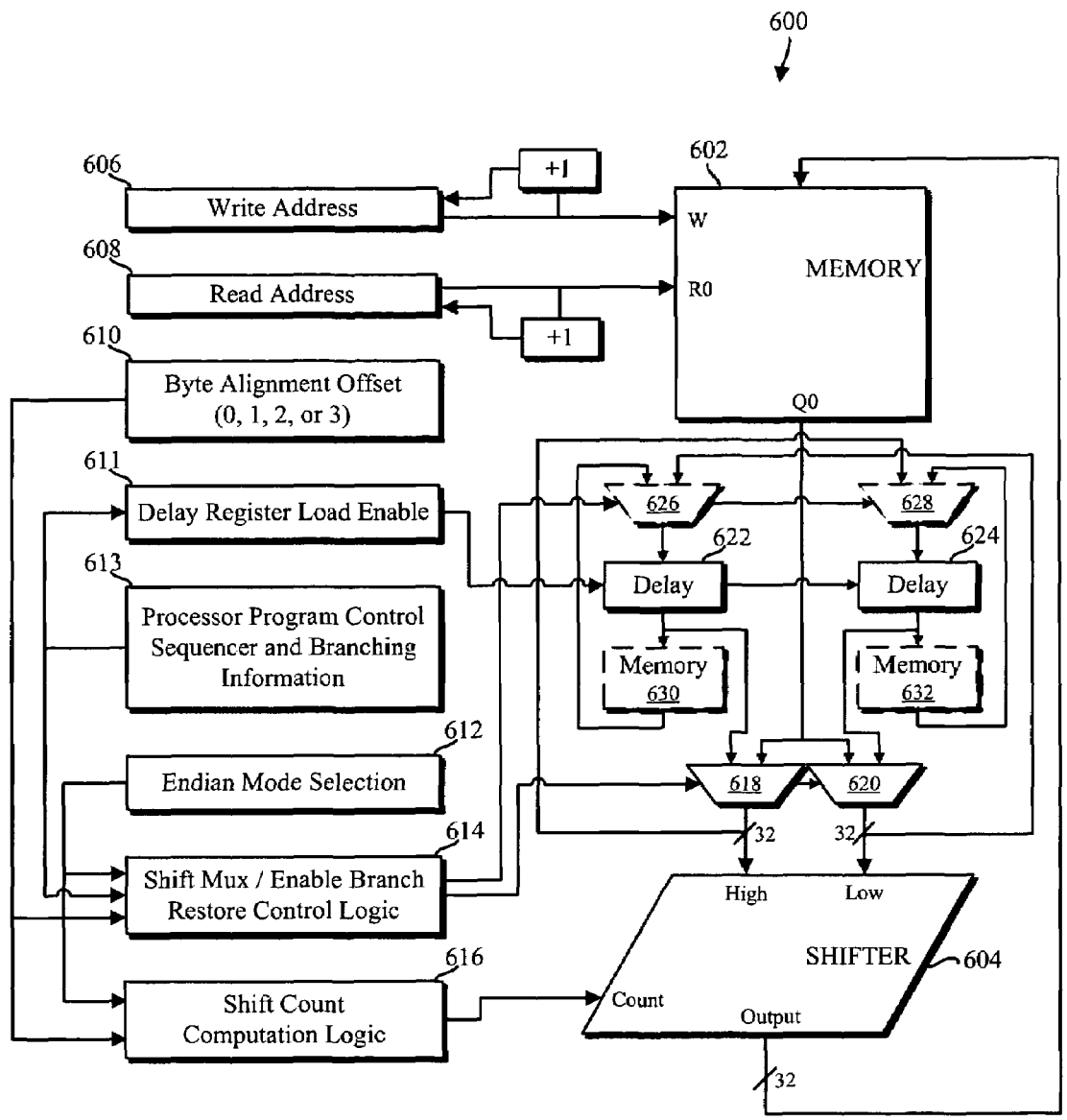
FIG. 6 is a diagram of an illustrative, reduced-area circuit for aligning data.

In some situations, it may be desirable to reduce the physical area of the byte alignment circuitry shown in FIG. 3. FIG. 6 shows an example of such a reduced-area system 600. Specifically, the system footprint is reduced by using a memory bank 602 that has one read port rather than two. In order to maintain the data alignment functionality, delay registers 622, 624 are added to the path leading to each of the shifter inputs. Delay registers 622, 624 store the value read from memory bank 602 on the previous clock cycle, so that two values from memory bank 602 can effectively be used by system 600 during each clock cycle, even though only one value is read from memory bank 602 each cycle. In some embodiments, delay registers 622, 624 could be loaded each cycle, while in other embodiments they could be loaded only upon initiation of a data alignment operation, so that non-data-alignment operations can use the shifter in a multiplexed manner without corrupting any data alignment operation that may be in progress. To that end, optional, relatively small, memory units 630, 632 can be used to restore the values contained in the delay registers, so that a data alignment operation can resume where it left off. Optional multiplexers 626, 628 control whether the values stored in memory 630, 632 are used, or whether the values from the outputs of multiplexers 618, 620 are used in the normal manner. Delay register load enable 611 and processor program control sequencer and branching control logic 613 control the use of delay registers 622, 624, and shift multiplexer/enable branch restore logic 614 controls multiplexers 626, 628.

Table 3 shows an exemplary control algorithm for the micro architecture shown in FIG. 6.

TABLE 3

Little Endian Control Algorithm
    Lower 32 bit shifter input = Delayed{Mem[address]}
    Upper 32 bit shifter input = Mem[address]
    Case (offset) {
        0: right shift count = 0
        1: right shift count = 8
        2: right shift count = 16
        3: right shift count = 24 }
Big Endian Control Algorithm
    if (Byte Alignment Offset = = 0) {
        Lower 32 bit shifter input = Delayed{Mem[address]}
        Upper 32 bit shifter input = DON'T CARE}
    else
        Lower 32 bit shifter input = Mem[address]
        Upper 32 bit shifter input = Delayed{Mem[address]}
        Case (offset) {
            0: right shift count = 0
            1: right shift count = 24
            2: right shift count = 16
            3: right shift count = 8}

As shown in Table 3, if the data stored in memory 602 is in little endian form (e.g., such as shown in FIGS. 2A and 2B), then the data stored at the address specified by read pointer 608 is sent to the upper 32-bit input of shifter 604, and the data stored in delay register 624 is sent to the lower 32-bit input. Next, depending on the offset that is specified, the data on the shifter inputs are shifted to the right by the amount shown in Table 3 (e.g., if the offset equals 0, the data is not shifted; if the offset equals 1, the data is shifted by 8 bits; and so forth).

If the data stored in memory 602 is in big endian form, then a check is first made to see if the offset equals zero. If the offset equals zero, then the data stored in delay register 624 is routed to the lower 32-bit input of shifter 604 to facilitate an effective shift of 32 bits in the manner previously described in connection with FIGS. 3 and 4. Otherwise, if the offset does not equal zero, the data stored in delay register 622 is sent to the upper 32-bit input of shifter 604, and the data stored at the address specified by read pointer 608 is sent to the lower 32-bit input. The data is then shifted in accordance with the specified offset.

Figure 7:
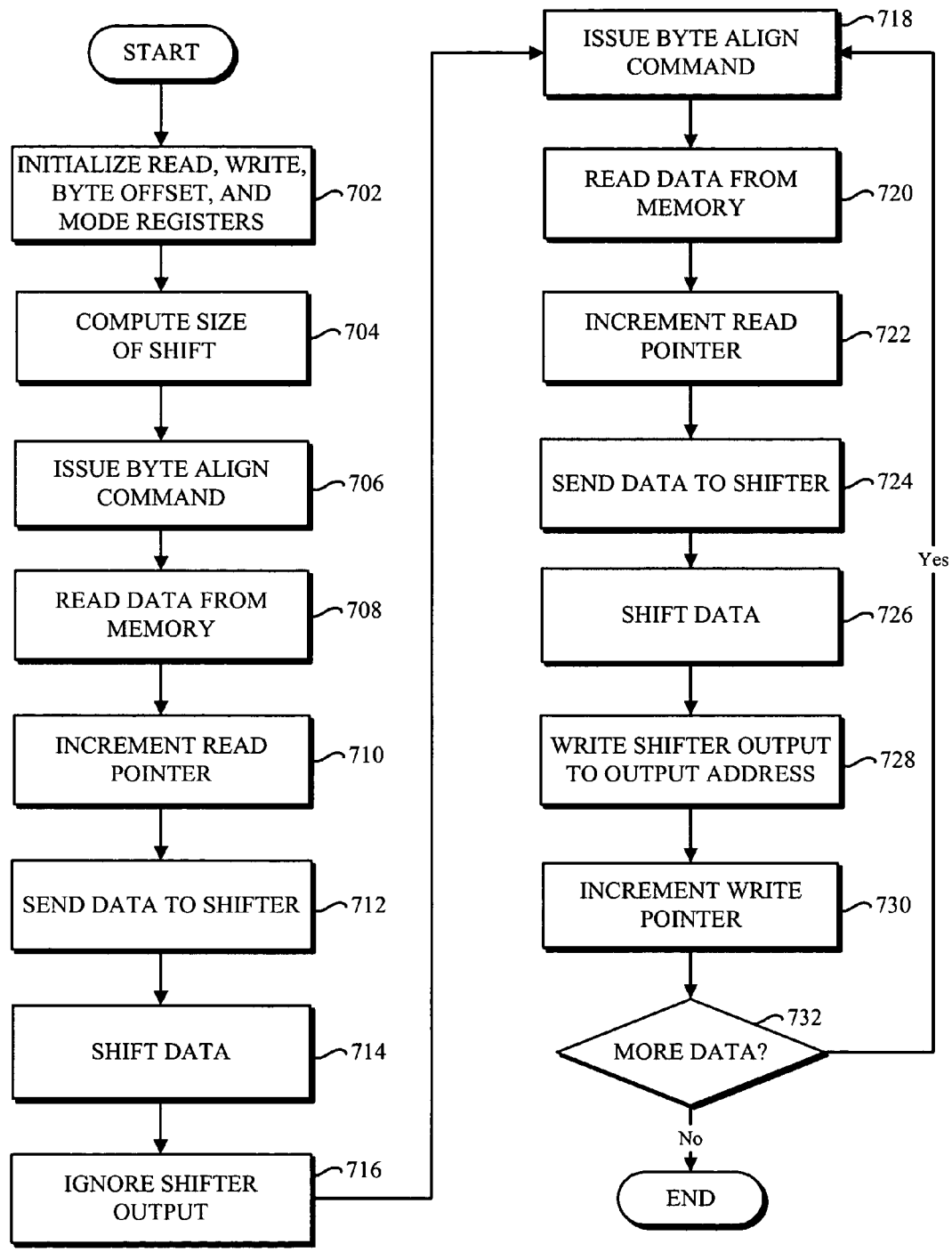
FIG. 7 is a flowchart of an illustrative process for aligning data using a system such as that shown in FIG. 6.

FIG. 7 further illustrates the use of the system shown in FIG. 6 to align the data shown in FIG. 1A. As shown in FIG. 7, the read, write, byte offset, and mode registers are first initialized (block 702). In the example shown in FIG. 1A, the initial read address is "Addr 0" 104a, the initial write address is "Addr 4" 104d, the byte offset is 1, and the mode is big endian.

Referring once again to FIG. 7, the magnitude of the shift is computed by shift count computation logic 616 (block 704). For the data shown in FIG. 1A, for example, shift count computation logic 616 calculates a right shift of 24 bits, since the data is stored in big endian form and has a byte offset of 1. Upon receiving a byte alignment command (block 706), data is retrieved from the memory location specified by read pointer 608 (e.g., memory location 104a in FIG. 1A) (block 708), the read pointer is incremented (block 710), and the data is sent to shifting resource 604 (block 712). In the example under discussion, the data that is read from address 104a is "??01 2345." Multiplexer control logic 614 directs multiplexers 618 and 620 to route this data to shifting resource 604's lower input, and to route data retrieved from delay register 622 to the shifting resource's upper input. Since delay register 622 has not been previously initialized, the data retrieved from it at this stage of the process will be arbitrary (e.g., "???? ????"). As shown in FIG. 6, the outputs from multiplexers 618 and 620 are also provided as inputs to delay registers 624, 622, respectively (via optional multiplexers 628, 626, if present).

The shifting resource 604 shifts the data on its inputs by the amount specified by shift count computation logic 616 (e.g., 24 bits) (block 714). The output of the shifter is ignored, however, since it includes data from uninitialized delay register 622 (block 716). In the example under consideration here, the shifter's output would be "???? ????".

Upon issuance of the next byte align command (block 718), the process continues at block 720, where data is once again read from memory 602 at the address specified by read pointer 608 (i.e., Addr 1, 104b). This data is sent, via multiplexer 620, to shift resource 604's lower input, and the data stored in delay register 622 during the previous shift cycle is sent, via multiplexer 618, to the shift resource's upper input (block 724). Thus, in the example under discussion, shift resource 604 receives "??01 2345" on its upper input, and "6789 ABCD" on its lower input.

Referring once again to FIG. 7, the data is then shifted by the amount specified by shift computation logic 616 (block 726). The output of shifter 604 is written to the memory location specified by write pointer 606 (block 728), and the write pointer is incremented (block 730). In the example shown in FIGS. 1A and 1B, the output of the shifting resource would be "0123 4567," which would be written to address 104d.

The shifting resource 604 is now ready to handle the next segment of data. If there is additional data to align (i.e., a "yes" exit from block 732), then upon receipt of the next byte alignment command (block 718), the process shown in blocks 720-732 is repeated. Thus, continuing with the example shown in FIGS. 1A and 1B, the data at location 104*c* is read from memory 602 (i.e., the memory location pointed to by read pointer 608) (block 720), and passed to shifting resource 604, along with the data stored in delay register 622 during the previous shift cycle (block 724). In the example under discussion, shift resource 604 thus receives "6789 ABCD" on its upper input (from delay register 622), and "EF?? ????" on its lower input (from memory location 104*c*). Shifter 604 shifts the data to the right by 24 bits (block 726), discards the upper 32 bits, and writes the result to the memory location specified by write pointer 606 (block 728). The result is the data arrangement shown in FIG. 1B.

It will be appreciated that the flow diagram shown in FIG. 7 illustrates one possible method for aligning data using a system such as that shown in FIG. 6, and that a variety of modifications can be made to this algorithm without affecting the result.

A micro-architecture such as that described in connection with FIGS. 6 and 7 can be used to align N words of data in N+1 clock cycles, where the extra cycle is used to fill the delay register. Thus, in the example discussed in connection with FIGS. 1A and 1B, two 32-bit words were aligned in three clock cycles. In addition, by using a memory unit 602 with only one read port, the area of the design is minimized.

A micro-architecture such as that shown in FIG. 6 also enables programmers to initiate the alignment of new, independent blocks of data prior to completing the alignment of a current block of data. There is simply a one cycle cost to re-fill the delay registers each time the programmer initiates the alignment of a new block of data or resumes aligning a block of data.

In the embodiment shown in FIG. 6, a little endian alignment can, without penalty, be multiplexed with an independent big endian alignment, as long as the big endian alignment uses an offset of 1, 2, or 3. This is possible because system 600 includes two independent delay registers 622, 624, one of which is used for little endian alignments, and the other for big endian alignments. Similarly, a big endian alignment with an offset of 0 can be multiplexed with an independent big endian alignment with an offset of 1, 2, or 3.

Speculative Execution

In an example processor instruction pipeline—such as Fetch/Decode/Operand Read/Execute/Memory Write—a data alignment operation may occur at the Execute stage and the result may be stored in the Memory Write stage. In this case, the delay registers will typically be loaded in the Execute stage, which is one cycle prior to the Memory Write stage. Thus, a processor that speculatively executes data alignment operations upon a conditional branch may corrupt the values of these registers if they are loaded prior to the resolution of the branch condition.

One option is to disallow speculative execution of the byte alignment resource. This can be done, for example, by simply adding a programming restriction in the product specification. For example:

| | |
|---|---|
| If bit 12 [register]= = 0, Goto to label # | |
| Byte align operation | ;illegal (must add an extra ;instruction in between ;these, for example nop) |
| label #: continue program | |

Another option is to stall the processor until the branch is resolved, before executing the alignment operation. There is some complexity in implementing such a stall, however. Also, adding an instruction will generally perform the same as a stall, but will often be superior in terms of reducing hardware complexity. Another option is to make use of a small amount of memory coupled to the delay registers (such as memory 630 and 632 in FIG. 6), along with logic to store prior values of the delay registers, and to restore the delay registers based on branching information sent from the processor control sequencer.

Single Delay Register on Shifter Inputs

As additional pipeline stages are added to a processor architecture, the number of stages between the execute and write-back stages may increase. Likewise, the size of the optional small memory to store and restore the delay register value would also need to increase. To minimize the area impact, the micro architecture can be enhanced to utilize only one delay register. The benefit is that only one small memory is needed to support the store and restore functions for speculative execution.

Figure 8:
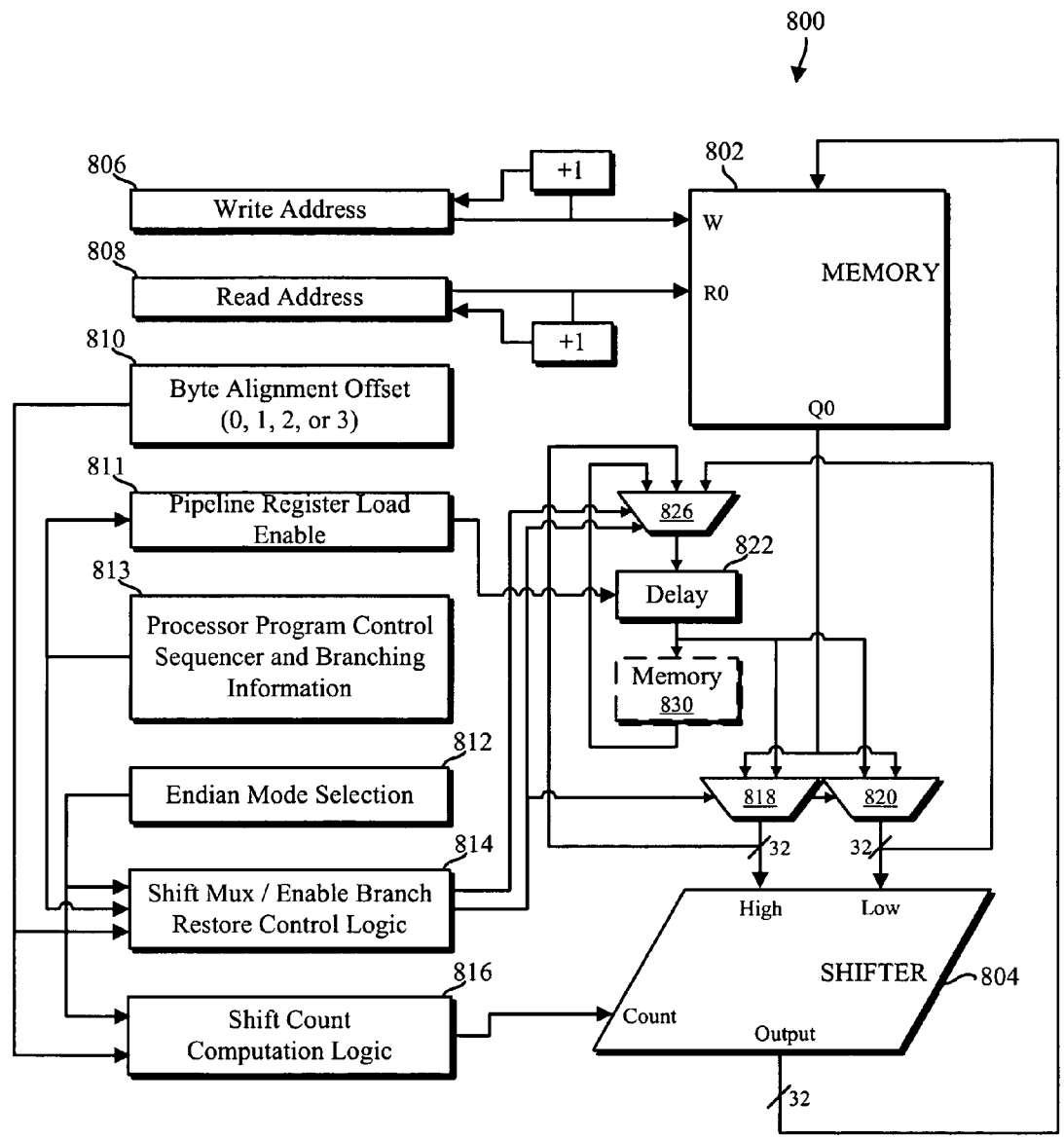
FIG. 8 is diagram of an alternative embodiment of an illustrative circuit for aligning data in a memory access application.

An example of such a system 800 is shown in FIG. 8. System 800 is similar to system 600 in FIG. 6, except delay register 624, optional memory 632, and optional multiplexer 628 have been removed. In the system shown in FIG. 8, multiplexer 826 is used to select the correct value to pass to delay register 822 (e.g., the output of multiplexer 818 or 820 that corresponds to the latest value read from memory unit 802). Multiplexers 818 and 820 pass the data read from memory 802 and the delayed data to the appropriate shifter inputs, as previously described in connection with FIGS. 6 and 7 and Table 3.

The disadvantages of using a system such as that shown in FIG. 8 are believed to be relatively minor. Namely, a little endian alignment can no longer be multiplexed with an independent big endian alignment without penalty. As with multiplexing two or more independent big endian data blocks or two or more independent little endian data blocks, there is also a one cycle penalty for resuming the alignment of an independent block of data prior to completing the current alignment.

Figure 9:
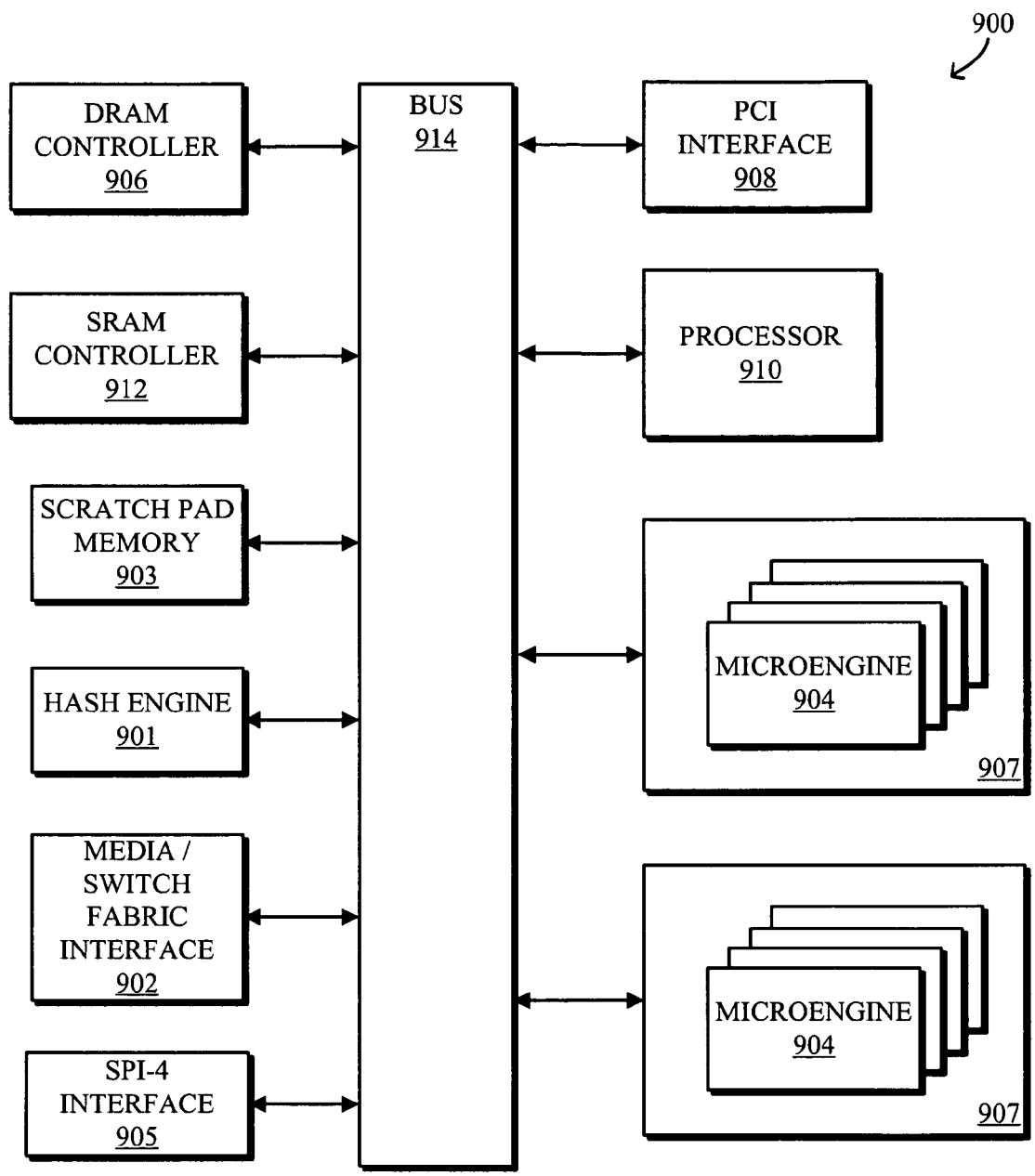
FIG. 9 is a diagram of an example system in which data alignment circuitry could be deployed.

Data alignment circuitry such as that shown in FIGS. 3, 6, and 8 can be incorporated in a network processor, server, personal computer, and/or the like to enhance the operation of the system. FIG. 9 shows an example of such a system. Specifically, FIG. 9 shows a network processor 900, such as might be used to perform packet processing and/or other networking operations. Network processor 900 has a collection of microengines 904, arranged in clusters 907. Microengines 904 may, for example, comprise multi-threaded, Reduced Instruction Set Computing (RISC) processors tailored for packet processing. As shown in FIG. 9, network processor 900 may also include a core processor 910 (e.g., an Intel Xscale® processor) that may be programmed to perform various "control plane" tasks, such as signaling stacks and communicating with other processors. The core processor 910 may also handle some "data plane" tasks, and may provide additional packet processing threads.

Network processor 900 may also feature a variety of interfaces for carrying packets between network processor 900 and other network components. For example, network processor 900 may include a switch fabric interface 902 (e.g., a Common Switch Interface (CSIX)) for transmitting packets to other processor(s) or circuitry connected to the fabric; an interface 905 (e.g., a System Packet Interface Level 4 (SPI-4) interface) that enables network processor 900 to communicate with physical layer and/or link layer devices; an interface 908 (e.g., a Peripheral Component Interconnect (PCI) bus interface) for communicating, for example, with a host; and/or the like.

Network processor 900 may also include other components shared by the microengines 904 and/or core processor 910, such as one or more static random access memory (SRAM) controllers 912, dynamic random access memory (DRAM) controllers 906, a hash engine 901, and a low-latency, on-chip scratch pad memory 903 for storing frequently used data. As shown in FIG. 9, one or more internal data and command buses 914 connect the various functional units together. The systems and methods described in connection with FIGS. 3, 6, and 8 can be integrated directly into microengines 904 and/or processor 910 to enhance the operation of system 900 by simplifying and/or reducing the overhead of the data alignment process.

It should be appreciated that FIG. 9 is provided for purposes of illustration, and not limitation, and that the systems and methods described herein can be practiced with devices and architectures that lack some of the components or features shown in FIG. 9, and/or that have other components or features that are not shown.

Figure 10:
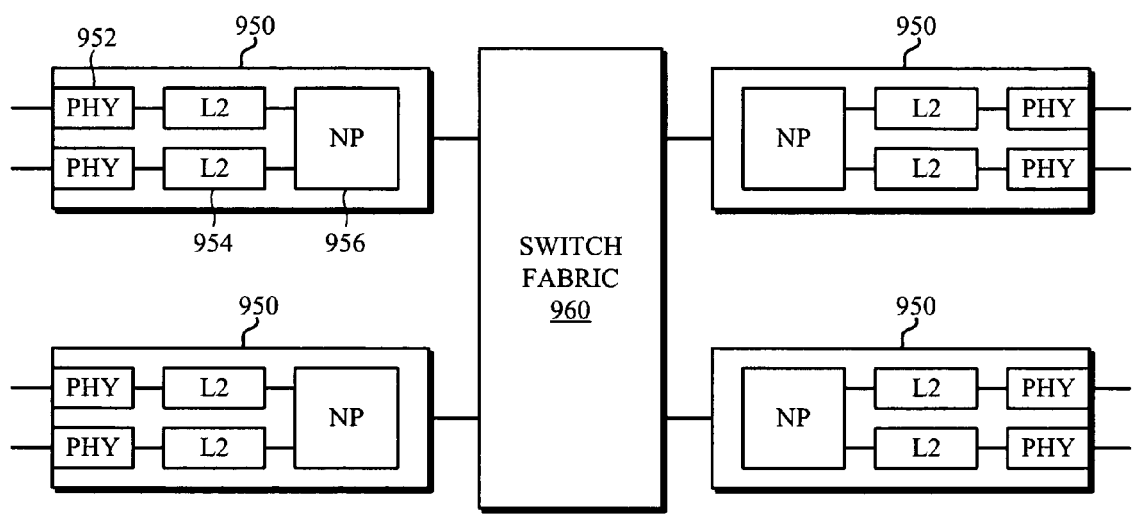
FIG. 10 is a diagram of another example system in which data alignment circuitry could be deployed.

The systems and methods described in connection with FIGS. 3, 6, 8, and 9 may also form part of a larger system, such as a network device. FIG. 10 shows an example of such a larger system. As shown in FIG. 10, the system features a collection of line cards or "blades" 950 interconnected by a switch fabric 960 (e.g., a crossbar or shared memory switch fabric). The switch fabric 960 may, for example, conform to the Common Switch Interface (CSIX) or another fabric technology, such as HyperTransport, Infiniband, PCI-X, Packet-Over-SONET, RapidIO, or Utopia.

Individual line cards 950 may include one or more physical layer devices 952 (e.g., optical, wire, and/or wireless) that handle communication over network connections. The physical layer devices 952 translate the physical signals carried by different network media into the bits (e.g., 1s and 0s) used by digital systems. The line cards 950 may also include framer devices 954 (e.g., Ethernet, Synchronous Optic Network (SONET), and/or High-Level Data Link Control (HDLC) framers, and/or other "layer 2" devices) that can perform operations on frames such as error detection and/or correction. The line cards 950 may also include one or more network processors 956 (such as network processor 900 in FIG. 9) to, e.g., perform packet processing operations on packets received via physical layer devices 952.

While FIGS. 9 and 10 illustrate a network processor and a device incorporating one or more network processors, it will be appreciated that the systems and methods described herein can be implemented in other data processing contexts as well, such as in personal computers, work stations, distributed systems, and/or the like, using a variety of hardware, firmware, and/or software. Thus, it should be understood that FIGS. 9 and 10 are provided for purposes of illustration, and not limitation.

Thus, while several embodiments are described and illustrated herein, it will be appreciated that they are merely illustrative. Other embodiments are within the scope of the following claims.

What is claimed is:

1. A system for aligning data, the system comprising:
   a memory unit;
   a shifter communicatively coupled to the memory unit;
   control logic operable to route data from the memory unit to the shifter and to send an indication to the shifter of an amount by which the data is to be shifted, the control logic being further operable to permit at least one big endian data alignment operation to be multiplexed with at least one little endian data alignment operation, the shifting by the control logic being achieved by:
   (1) if the data is big endian form, directing a first part of the data to a first input of the shifter if an offset is equal to zero and directing the first part of the data to a second input of the shifter and a second part of the data to the first input of the shifter if the offset is not equal to zero, and
   (2) if the data is little endian form, directing the first part of the data to the first input of the shifter and directing the second part of the data to the second input of the shifter, and
   shifting the data on the first and second shifter circuit inputs by an amount derived from the offset.

2. The system of claim 1, in which the memory unit, the shifter, and the control logic are integrated within a processing unit.

3. The system of claim 2, in which the processing unit comprises a microengine in a network processor.

4. The system of claim 1, in which the control logic further comprises:
   first and second delay registers, the first and second delay registers each being operable to output data previously retrieved from the memory unit;
   delay register control logic, the delay register control logic being operable to select, for storage in each delay register, a first shifter input or a second shifter input, the selected shifter input holding data retrieved from the memory unit.

5. The system of claim 4, in which the control logic further comprises:
   multiplexer control logic operable to derive a selection signal based at least in part on an endian form used to store data in the memory unit; and
   first and second multiplexers operable to selectively direct data from the memory unit to inputs of the shifter in accordance with the selection signal.

6. A system for aligning data, the system comprising:
   a first memory unit;
   a shifter communicatively coupled to the first memory unit;
   control logic operable to route data from the first memory unit to the shifter and to send an indication to the shifter of an amount by which the data is to be shifted, the control logic including a delay register and a second memory unit, the control logic being further operable to support speculative execution by storing previous values of delay register data in the second memory unit, and restoring the previous values based on branching information received from a processor.

7. The system of claim 6, in which the processor comprises a microengine in a network processor.

8. The system of claim 6, in which the control logic further comprises:
   delay register control logic, the delay register control logic being operable to select, for storage in the delay register, a first shifter input or a second shifter input, the selected shifter input holding data retrieved from the memory unit.

9. The system of claim 6, in which the control logic further comprises:
   multiplexer control logic operable to derive a selection signal based at least in part on an endian form used to store data in the memory unit; and
   first and second mQltiplexers operable to selectively direct data from the memory unit to inputs of the shifter in accordance with the selection signal.

10. A method comprising:
reading data from a memory unit;
determining whether the data is in big endian form;
if the data is in big endian form, determining if an offset associated with the data is equal to zero;
if the offset is equal to zero, directing a first part of the data to a first input of a shifter circuit, the shifter being operable to pass the first part of the data through to its output without shifting;
if the offset is not equal to zero, directing the first part of the data to a second input of the shifter circuit, and directing a second part of the data to the first input of the shifter circuit;
if the data is in little endian form, directing the first part of the data to the first input of the shifter circuit, and directing the second part of the data to the second input of the shifter circuit;
shifting the data on the first and second shifter circuit inputs by an amount derived from the offset; and
writing an output from the shifter circuit to the memory unit.

11. The method of claim 10, in which the shifter circuit is operable to accept 64 bits of data as input, and to output 32 bits of data.

12. A system comprising:
a memory unit, the memory unit having at least two inputs operable to accept addresses of data to be retrieved from the memory unit;
shift count logic operable to calculate a number of bits by which to shift a block of data, the shift count logic including a delay register and a second memeory unit, the shift count logic being further operable to support speculative execution by storing previous values of delay register data in the second memory unit, and restoring the previous values based on branching information received from a processor;
mode selection logic operable to indicate whether the block of data is stored in big endian form; and
a shifter communicatively coupled to the memory unit and the shift count logic, the shifter being operable to accept data from the memory unit and to shift it by an amount specified by, or derived from, a value provided by the shift count logic.

13. The system of claim 12, further comprising:
multiplexer control logic operable to derive a selection signal based at least in part on an output of the mode selection logic; and
first and second multiplexers operable to selectively direct data from the memory unit to inputs of the shifter in accordance with the selection signal.

14. The system of claim 12, in which the shifter is operable to accept 64 bits of data as input, and to output 32 bits of data.

15. A system comprising:
a memory unit;
mode selection logic operable to indicate whether a block of data is stored in the memory unit in big endian form;
shift count logic communicatively coupled to the mode selection logic, the shift count logic being operable to calculate a number of bits by which to shift a block of data retrieved from the memory unit;
a delay register, the delay register being operable to output data retrieved from the memory unit on a first clock cycle;
a shifter communicatively coupled to the memory unit and the shift count logic, the shifter being operable to accept (i) delay register data from the delay register, and (ii) memory unit data retrieved from the memory unit on a second clock cycle, and to shift said delay register data and said memory unit data by an amount specified by, or derived from, a value provided by the shift count logic; and
delay register control logic, the delay register control logic being communicatively coupled to the mode selection logic, and being operable to select, for storage in the delay register, a first shifter input or a second shifter input, the selected shifter input holding data retrieved from the memory unit on the second clock cycle.

16. The system of claim 15, further comprising:
a second memory unit, the second memory unit being communicatively coupled to an output of the delay register; and
logic operable to detect a speculative execution error, and to cause the delay register to be loaded with data contained in the second memory unit.

* * * * *

UNITED STATES PATENT AND TRADEMARK OFFICE
CERTIFICATE OF CORRECTION

PATENT NO. : 7,412,584 B2  Page 1 of 1
APPLICATION NO. : 10/838078
DATED : August 12, 2008
INVENTOR(S) : Niell et al.

It is certified that error appears in the above-identified patent and that said Letters Patent is hereby corrected as shown below:

In column 11, line 63, in Claim 1, after "unit;" insert -- and --.

In column 12, line 4, in Claim 1, after "is" insert -- in --.

In column 12, line 10, in Claim 1, after "is" insert -- in --.

In column 12, line 65, in Claim 9, delete "mQltiplexers" and insert -- multiplexers --, therefor.

In column 13, line 31, in Claim 12, delete "memeory" and insert -- memory --, therefor.

Signed and Sealed this

Sixteenth Day of December, 2008

JON W. DUDAS
*Director of the United States Patent and Trademark Office*